July 18, 1961

T. T. BUNCH 2,993,113

BRUSHLESS POWER SUPPLIES

Filed Oct. 2, 1959

INVENTOR.
T. T. BUNCH
BY
Don P. Bush
ATTORNEY

INVENTOR.
T. T. BUNCH
BY
Don P. Bush
ATTORNEY

United States Patent Office 2,993,113
Patented July 18, 1961

2,993,113
BRUSHLESS POWER SUPPLIES

Tillman T. Bunch, Princeton, N.J., assignor to Western Electric Company, Incorporated, New York, N.Y., a corporation of New York
Filed Oct. 2, 1959, Ser. No. 843,955
15 Claims. (Cl. 219—155)

This inventon relates to brushless power supplies and more particularly, although not exclusively, to brushless generators for supplying electrical current for heating successive portions of continuously moving electrically conductive material to a predetermined temperature.

This invention is applicable to many operations in connection with many manufacturing processes but is herein disclosed as particularly applicable for electrically heating a continuously moving conductor which is in motion between a source of supply thereof to a coating apparatus, such as a plastics extruder. The conductor may be a copper conductor which has been hardened previously as a result of cold working thereof in a drawing operation. The electrical power is used to heat the conductor a sufficient amount to partially or completely anneal the conductor and also to prevent too sudden chilling of the plastic.

Strand annealing is not new; however, most strand annealers are subject to undesirable extraneous points of high and uncertain resistances, such as brushes, slip rings, etc. Brushes and slip rings are subject to wearing and pitting and deteriorate with time. Further, extra power must be provided which is normally lost in the extraneous elements.

In order to overcome these and other undesirable features, it is an object of the present invention to provide new and improved brushless power supplies.

It is another object of the present invention to provide new and improved apparatus for continuously heating indefinite lengths of electrically conductive material.

It is a further object of the present invention to provide new and improved apparatus for annealing a continuously moving, indefinite length of electrically conductive material which is in direct contact with the rotor of a generator thus eliminating the need for current collecting brushes.

A brushless power supply for heating indefinite lengths of electrically conductive material, embodying certain features of the present invention, may include means for producing a field of magnetic flux and at least one electrically conductive member designed to be moved transversely of the lines of flux of the magnetic field. Means are provided for moving the conductive member through the field and for moving successive portions of an indefinite length of the conductive material continuously. Means are also provided for electrically and mechanically connecting the successive portions of the continuously moving indefinite length of conductive material, to be heated, with one end of the conductive member for at least a portion of the time during which the conductive member is passing through the field of magnetic flux, and for simultaneously connecting the opposite end of the conductive member instantaneously electrically to one of the successively definite portions of the electrically conductive material. Commutating or rectifying means may be used for regulating the direction of flow of current in the strand material so that unidirectional current flows in the portion of the strand material connected electrically to the opposite ends of the conductive member. The successive portions of the strand material connected electrically between opposite ends of the conductive member are heated as a result of their resistance to the flow of current induced therein when the conductive member is passed transversely of the lines of flux of the magnetic field.

Other objects and features of the present invention will be more readily understood from the following detailed description of specific embodiments thereof when read in conjunction with the accompanying drawings, in which.

Figure 1:
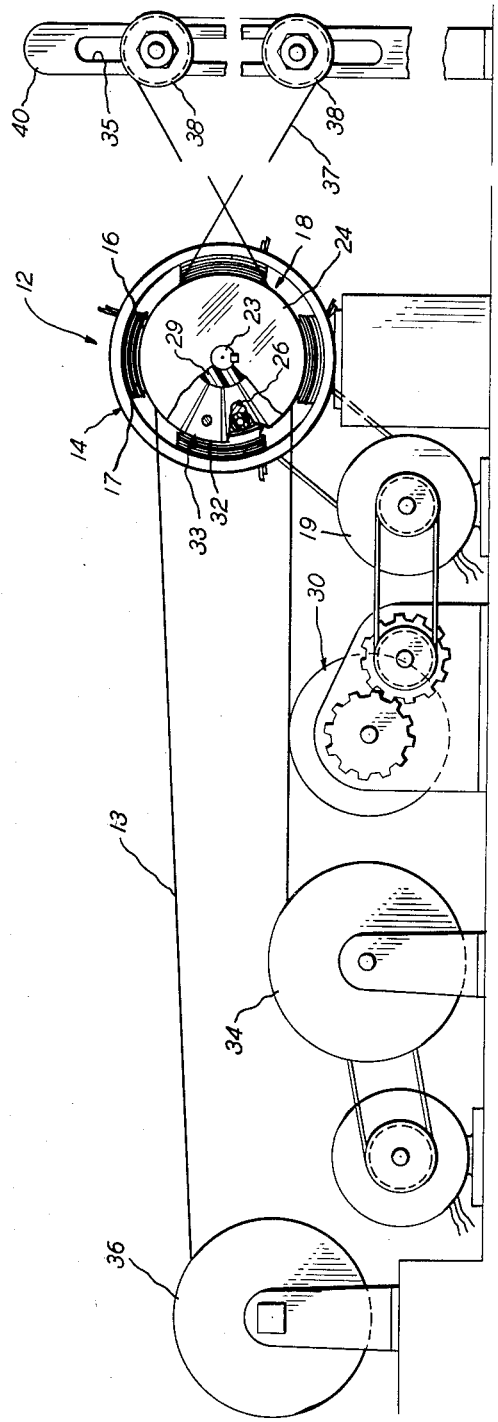
FIG. 1 is a fragmentary, diagrammatic view of an apparatus for electrically heating continuously moving strand material embodying certain features of the present invention with portions thereof broken away for purposes of clarity.
Figure 2:
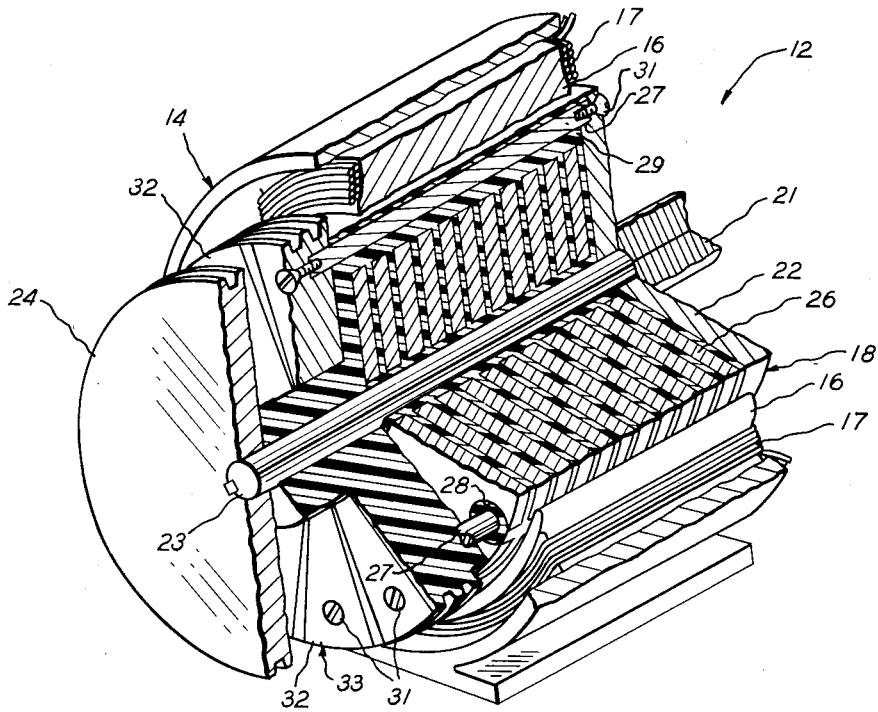
FIG. 2 is an enlarged, fragmentary, perspective, diagrammatic view of a power supply of the apparatus of FIG. 1.

Referring now to the drawings and more particularly, to FIGS. 1 and 2 thereof, there is shown an apparatus for electrically heating advancing, indefinite lengths of electrically conductive material which includes a brushless power supply, designated generally by the numeral 12. The power supply 12 may be utilized as a motor or generator but is herein illustrated as being utilized as a generator. In the preferred embodiment, the power supply 12 is used as a generator to produce direct current for electrically heating successive portions of an indefinite length of rapidly and continuously moving electrically conductive strand material, designated generally by the numeral 13, to a predetermined temperature for annealing the successive portions of the conductive material. It should be understood that the electrically conductive material does not necessarily have to be strands or filaments but could be in the form of tapes or any other desirable configuration.

The generator 12 has a conventional stator, designated generally by the numeral 14 (FIG. 2), which includes at least one pair of magnetic pole pieces 16—16 at diametrically opposed points thereof for producing a field of magnetic flux. The pole pieces 16—16 may be permanent magnets or electromagnets, but are herein illustrated as electromagnets which are magnetized by coils 17—17 having a variable number of turns therein. The coils 17—17 are energized by a variable current supply (A.C. or D.C.) (not shown). The field of magnetic flux is produced by lines of magnetic flux passing between the pole pieces 16—16.

A rotor, designated generally by the numeral 18, of the generator 12 is driven at a variable speed by external means, such as a motor 19, through a shaft 21 on which the rotor 18 is mounted rotatably. The rotor 18 includes a flat, circular, conductive plate 22 secured to the driven shaft 21, and a conductive central shaft 23 which connects the plate 22 to a conductive sheave 24 electrically and mechanically. The rotor 18 is provided with a conventional core 26 made of laminated magnetic material, such as iron. The laminations of the core 26 are insulated individually from each other, and the core 26 is insulated electrically and thermally from the adjacent elements of the rotor 18.

A plurality of conductive rods 27—27 are disposed in spaced relationship around the rotor 18, adjacent to the outer periphery thereof, in substantially circular slots 28—28 in the outer periphery of the iron core 26. The conductive rods 27—27 are insulated electrically and thermally from each other and the adjacent portions of the iron core 26 by cast-resin insulating material 29, such as epoxy resin or cementing mica, and are connected to the conductive plate 22 by suitable means, such as screws 31—31. A segment 32 of a double-grooved, segmented commutating sheave, designated generally by the numeral 33, is secured to each of the conductive rods 27—27 on the ends thereof opposite to those on which the conductive plate is secured by appropriate means, such as screws 31—31. The commutator segments 32—32 are insulated electrically and thermally from each other and the adjacent portions of the iron core 26 by the cast-resin, insulating material 29, such as epoxy resin or cemented mica.

A strand-advancing capstan 30 is provided for pulling successive portions of the strand material 13 from a brake-retarded supply reel 36, into a conductive loop portion 37 of the heating system, and delivering the strand material to a motor-driven take-up reel 34. The capstan 30 is driven in unison with the rotor 18 by the motor 19 so that as the speed of the strand material 13 decreases the speed of the rotor 18 and generated voltage will decrease to produce a partially self-controlling system. However, it should be noted that if the strand material 13, being heated, is sufficiently strong it may be used to drive the rotor 18 as it is moved in contact with the sheaves 24 and 33.

As the strand material 13 enters the conductive loop 37, it contacts one or more of the successive segments 32—32 of the commutating sheave 33 as the sucessive segments 32—32 are moved instantaneously past a position adjacent to one of the pole pieces 16—16. The successive portions of the strand material 13 are then passed partially around a pair of spaced, adjustable, nonconductive sheaves 38—38 and leave the conductive loop 37 by contacting one or more successive segments 32—32 of the commutating sheave 33 as the segments 32—32 move past a position diametrically opposed position the segments 32—32 are contacted by the strand material 13 as the strand material enters the conductive loop 37.

The sheaves 38—38 are mounted so that the crossing portions (FIG. 1) of the strand material 13 extending from the sheaves 38—38 to the sheave 33 do not touch each other. The sheaves 38—38 are mounted adjustably in an elongated slot 35 in a support 40. The sheaves 38—38 may be adjusted to vary the length of the loop 37 of the conductive strand material 13 extending therearound, between diametrically opposed segments 32—32 on commutating sheave 33. The portions of the strand material 13 may pass through one of the grooves of the sheave 33 when entering into and exiting from the loop 37. However, in order to help insure that the crossing portions of the strand material 13 do not touch each other, it is preferable that the portions of the strand material 13 be passed through one of the grooves of the sheave 33 when entering into and the other groove when exiting from the loop 37.

The conductive portions of the conductive and commutating sheaves 24 and 33 are preferably made of bronze. The sheaves 38—38 are preferably made of Heanium, an alumina ceramic manufactured by the Heaney Industrial Ceramics Corp. The grooves in the sheaves 24 and 33 should be relatively deep and should have relatively steep sides and flat bottoms to reduce wire vibrations. All of the sheaves should be dynamically balanced and line up with the desired path of travel of the strand material 13.

*Preferred method of operation*

In this particular embodiment, the brushless generator 12 is utilized for progressively heating the successive portions of the conductive strand material 13 forming the loop 37. The strand material 13 is advanced continuously over the commutating sheave 33, partially around the pair of nonconductive sheaves 38—38 and back to opposite sides of the commutating sheave 33. The heat is produced as a result of the resistance of the conductive strand material 13 to the flow of current therein which is generated by the conductive rods 27—27 cutting the lines of magnetic flux when the rotor 18 of the power supply 12 is driven by the motor 19. As the rotor 18 is rotated, the conductive rods 27—27 cut the lines of magnetic flux flowing between the pole pieces 16—16 causing current to flow in one direction in the conductive rods 27—27 as they move past one magnetic pole piece 16 and in the other direction as the conductive rods 27—27 move past the opposite magnetic pole piece 16.

An electrical heating circuit is completed by the conductive rods 27—27 on diametrically opposed sides of the rotor 18 being connected together electrically and mechanically internally of the power supply 12 on one end thereof by the conductive plate 22 and externally of the rotor 18 on the other end thereof by successive portions of the strand material 13 forming the loop 37. In this way, all of the contact losses are utilized to heat successive portions of the strand material 13 and thus prevent undesirable contact losses which result when current-collecting brushes are utilized in such apparatus. If it be known that the power supply 12 will always be utilized in the preferred method of operation, the conductive shaft 23 and conductive sheave 24 may be eliminated therefrom.

If it is desirable to utilize the power supply to heat two conductors at the same time, the portions of a different indefinite length of electrically conductive strand material (not shown) may enter and leave a conductive loop of strand material by being passed in contact with successive diametrically opposed segments of the commutating sheave which are advanced instantaneously past a pair of diametrically opposed pole pieces 16—16. The last-mentioned pair of pole pieces 16—16 may be oriented anguarly with respect to the pair of pole pieces 16—16 being utilized in the generation of current to heat the other loop 37 of strand material 13. In that event, it is preferable to have two or more grooves on the commutating sheave 33 so that the different pieces of strand material will not touch each other.

*Alternative method of operation*

The conductive sheave 24 and conductive shaft 23 are provided so that the power supply 12 may be utilized to heat as many as twice the number of loops 37 of strand material 13 as could be heated with the power supply 12 used in the preferred way. The power supply 12, provided with the conductive shaft 23 and conductive sheave 24, may also be utilized for heating strand material 13 when less current is required or desired without adjusting the heating apparatus.

When it is desirable to utilize the power supply 12 in this manner, successive portions of the strand material 13 are advanced from the supply reel 36, in contact instantaneously with one or more of the successive segments 32—32 of the commutating sheave 33 as the successive segments 32—32 of the sheave 33 are moved past a position adjacent to one of the pole pieces 16—16 (FIG. 2). The strand material 13 is then passed around the pair of spaced, adjustable nonconductive sheaves 38—38, at least partially around the solid conductive sheave 24 and to the take-up reel 34.

In this particular embodiment, the brushless generator or power supply 12 is utilized to progressively heat the successive portions of the strand material 13, forming the loop 37 of the conductive material. The strand material 13 is advanced continuously over the commutating sheave 33, partially around the pair of nonconductive sheaves 38—38 and back to a solid conductive sheave 24. As the rotor 18 is rotated, the conductive rods 27—27 cut the lines of magnetic flux flowing between the pole pieces 16—16 causing current to flow in the successive conductive rods 27—27 moving past the position the associated segments 32—32 of the commutating sheave 33 are contacted by the strand material 13. An electrical heating circuit is completed by the successive conductive rods 27—27 associated with the successive segments 32—32 of the commutating sheave 33, contacted by the strand material 13, being connected electrically and mechanically to the conductive sheave 24 internally of the rotor 18 by the conductive plate 22 and conductive shaft 23 and externally of the rotor 18 by successive portions of the strand material 13 in the loop 37.

It should be noted that, in order to keep the power supply 12 as cool as possible, it is preferable to have the heated portion of the strand 13 exit from the loop 37 in contact with the solid sheave 24 rather than the commutating sheave 33. However, if it is desirable to utilize the power supply 12 to heat two pieces of strand material simultaneously, a second strand may be directed into the heating system in contact with the solid conductive sheave 24 and around the pair of sheaves 38—38 in grooves different from those in which the other conductive strand material 13 passes or on a separate pair of sheaves (not shown). The second piece of strand material would then be passed in contact with the side of the commutating sheave 33 opposite to that contacted by the other piece of strand material 13.

Second embodiment

Figure 3:
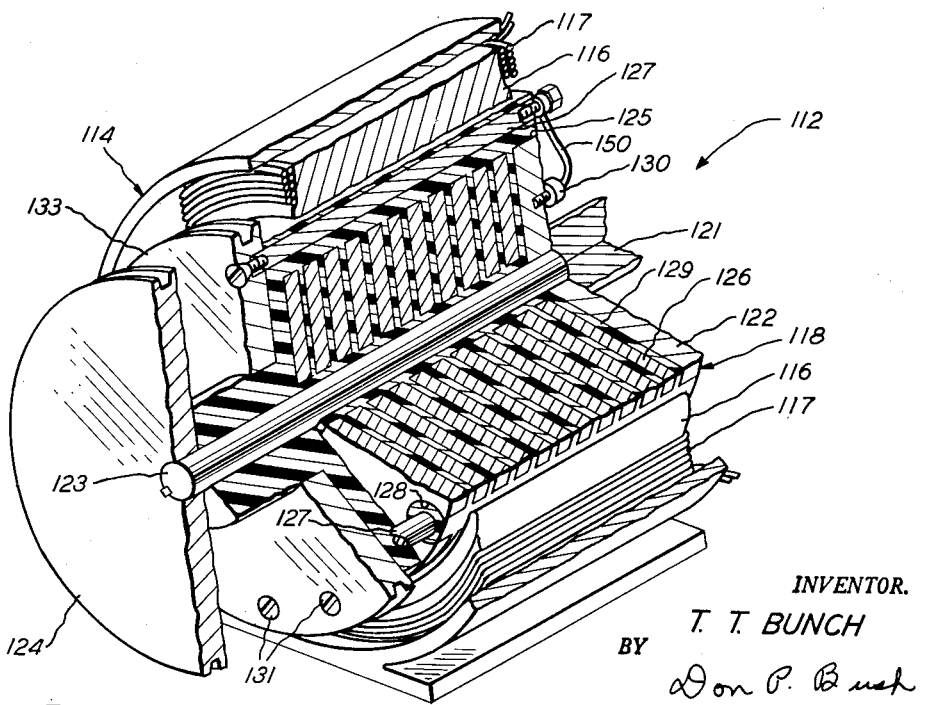
FIG. 3 is an enlarged, fragmentary, perspective, diagrammatic view of an alternative embodiment of the power supply of FIG. 1.

Referring now to FIG. 3, there is shown a different embodiment of a power supply, designated generally by the numeral 112, which may be substituted in the annealing apparatus of FIG. 1 for power supply 12. The power supply 112 includes a conventional stator 114. The stator 114 includes a plurality of magnetic pole pieces 116—116 for producing a field of magnetic flux. The pole pieces 116—116 may be permanent magnets or electromagnets, but are herein illustrated as electromagnets which are magnetized by the windings 117—117.

A rotor 118 is mounted rotatably on a driven shaft 121. A conductive plate 122, having a plurality of equally spaced apertures 125—125 adjacent to the outer periphery thereof, is secured to the shaft 121. A solid conductive sheave 124 and a second solid conductive sheave 133 are provided so that the strand material 13 may pass thereover and make electrical contact with the rotor 118 of the power supply 112. A plurality of conductive rods 127—127 are spaced around the outer periphery of the rotor 118 and secured to the solid conductive sheave 133 by appropriate means, such as screws 131—131. Adjacent ends of the conductive rods 127—127 each pass through one aperture 125 in the plate 122. The rods are insulated electrically and thermally from the plate 122 by suitable cast-resin plastic material 129, such as epoxy resin or cemented mica.

A conventional laminated iron core 126 is provided for the rotor 118. The laminations of iron core 126 are insulated individually from each other and the iron core is insulated electrically and thermally from the adjacent elements of the rotor 118 of the power supply 112. A plurality of rectifiers 130—130, such as silicon, high-current rectifiers, type 4JA60C, supplied by the General Electric Company, are secured in the plate 122 and in electrical contact therewith. Electrical leads 150—150 are used to connect each of the rods 127—127 to one of the rectifiers 130—130 which, in turn, permits current to pass through the associated rod 127 in only one direction. When the rods 127—127 cut the line of magnetic flux as a result of the rotation of the rotor 118, the current is rectified to produce direct current between the solid conductive sheaves 124 and 133 and thus eliminate the necessity of a commutator.

Operation of second embodiment

In this particular embodiment, the brushless generator 112 is utilized to progressively heat the successive portions of the conductive strand material 13 forming the loop 37. The successive portions of the strand material 13 are advanced continuously at least partially around one of the solid conductive sheaves 124 or 133, around the pair of nonconductive sheaves 38—38 and back to the other solid conductive sheave 124 or 133. As the rotor 118 is rotated, the conductive rods 127—127 cut the lines of magnetic flux flowing between the pole pieces 116—116 causing current to flow in the successive conductive rods 127—127 moving through the lines of flux. An electrical heating circuit is completed internally of the rotor 118 from the solid conductive sheave 133 through the successive conductive current-generating rods 127—127, in the direction permitted by the rectifiers 130—130, through the conductive plate 122 and a conductive shaft 123 to the conductive sheave 124. The heating circuit is completed externally of the rotor 118 by successive portions of the strand material 13 in the loop 37.

It is to be understood that the above-described arrangements are simply illustrative of the application of the principles of the invention. Other arrangements may be devised by those skilled in the art which will embody the principles of the invention and fall within the spirit and scope thereof.

What is claimed is:

1. A brushless power supply for heating indefinite lengths of electrically conductive material, which comprises means for producing a field of magnetic flux, at least one electrically conductive member designed to be moved transversely of the lines of flux of the magnetic field to produce electromotive force, means for moving the conductive member transversely of the lines of flux of the magnetic field, for electrically and mechanically connecting successive portions of a continuously moving indefinite length of conductive material to be heated with one end of the conductive member for at least a portion of the time during which the conductive member is passing through the field of magnetic flux, and for moving the successive portions of the conductive material transversely of the longitudinal axis of the conductive member and in a path substantially parallel to the path of travel of the conductive member through the field of magnetic flux, means for connecting the opposite end of the conductive member instantaneously electrically to one of successively different portions of the electrically conductive material, and means for regulating the direction of flow of current in the electrically conductive material so that unidirectional heating current flows in the portion of the electrically conductive material extending between the ends of the conductive member as a result of the conductive member being passed transversely of the lines of flux of the magnetic field.

2. A brushless power supply for heating indefinite lengths of electrically conductive material, which comprises means for producing a field of magnetic flux, at least one electrically conductive member designed to be moved transversely of the lines of flux of the magnetic field to produce electromotive force, a pulley over which an indefinite length of electrically conductive material to be heated is directed, at least portions of the pulley being electrically conductive, an electrically conductive portion of the pulley being connected mechanically and electrically to one end of the conductive member for movement therewith, means for directing successive portions of the indefinite length of conductive material in contact with at least one conductive portion of the pulley and for moving the electrically conductive member transversely of the lines of flux of the magnetic field, means for connecting the opposite end of the conductive member to one of successively different portions of the conductive material a constant predetermined distance along the conductive material from the point of contact of the sheave, and means for regulating the direction of flow of current in the material so that unidirectional heating current flows in the portion of the material extending between the pulley and the means for connecting the opposite end of the conductive member thereto as a result of the conductive member being passed transversely of the lines of flux of the magnetic field.

3. A brushless power supply for heating electrically conductive strand material, which comprises a stator for producing a magnetic field; a rotor which includes a plurality of electrically conductive rods disposed in spaced relationship to each other adjacent to the outer periphery of the rotor, a sheave at least portions of which are electrically conductive connected electrically and mechanically to adjacent ends of the conductive rods, a second electrically conductive sheave connected mechanically to the first-mentioned sheave, means for electrically connecting the opposite ends of the conductive rods to the second conductive sheave, and a core of magnetic material for facilitating the passage of the lines of magnetic flux from one portion of the stator to the other; means for guiding successive portions of the strand material at least partially around one of the sheaves through a path of travel to form a loop of the conductive material of a predetermined length and at least partially around the other conductive sheave; means for propelling the conductive material and rotating the rotor so that the conductive rods thereof cut the lines of magnetic flux produced by the stator, and means for unidirectionalizing the current produced as a result of the conductive rods cutting the lines of magnetic flux so that successive portions of the strand material in the loop will be heated as a result of the resistance of the strand material to the flow of current therein.

4. A brushless power supply for progressively heating a continuously advancing indefinite length of electrically conductive strand material, which comprises a stator for producing a field of magnetic flux; a rotor which includes a plurality of electrically conductive rods disposed in spaced relationship adjacent to the outer periphery thereof to cut the lines of magnetic flux produced by the stator, means for electrically connecting adjacent ends of the rods commonly to each other and a segmented commutating sheave, each of the opposite ends of the rods being attached to a separate segment of the commutating sheave; means for guiding successive portions of the strand material in contact with at least one segment on one side of the commutating sheave through a path of travel to form a loop of the conductive material of a predetermined length and in contact with at least one of the segments on the diametrically opposed side of the segmented commutating sheave, and means for propelling the strand material and rotating the rotor to move the conductive rods thereof transversely of the lines of magnetic flux produced by the stator; whereby current, passing through the conductive rods as a result of the conductive rods cutting the lines of magnetic flux, is commutated to produce a flow of direct current internally of the rotor from the segment of the commutating sheave on one side in contact with the conductive strand material at any one instant, through the conductive rod connected to the segment of the sheave contacted by the strand material, through the common connection, through the conductive rod associated with the segment contacting the strand material on the diametrically opposed side of the commutating sheave which is contacted by the strand material and through the last-mentioned segment, and externally of the rotor through the loop of strand material extending between the opposite sides of the commutating sheave so that successive portions of the strand material in the loop will be heated as a result of the resistance of the strand material to the flow of current therein.

5. A brushless power supply for progressively heating a continuously advancing indefinite length of electrically conductive strand material, which comprises a stator for producing a field of magnetic flux; a rotor which includes a plurality of electrically conductive rods disposed in spaced relationship adjacent to the outer periphery thereof to cut the lines of magnetic flux produced by the stator, a conductive plate and a segmented commutating sheave, each of the rods being attached on one end to a separatae segment of the commutating sheave and on the other end to the conductive plate; means for guiding successive portions of the strand material in contact with at least one segment on one side of the commutating sheave through a path of travel to form a loop of the conductive material of a predetermined length and in contact with at least one of the segments on the opposite side of the segmented commutating sheave; and means for rotating the rotor, whereby current, passing through the conductive rods as a result of the conductive rods cutting the lines of magnetic flux, is commutated to produce a flow of direct current in the rotor between the segment of the commutating sheave on one side contacted by the strand material, through the conductive rod connected to the segment of the sheave contacted by strand material, through the conductive plate, through the conductive rod associated with the segment on the opposite side of the commutating sheave which is contacted by the strand material and through the last-mentioned segment, and externally of the rotor through the loop of strand material extending between the opposite sides of the commutating sheave so that successive portions of the strand material in the loop will be heated as a result of the resistance of the strand material to the flow of current therein.

6. A brushless power supply for progressively heating a continuously advancing indefinite length of electrically conductive strand material, which comprises a stator for producing a field of magnetic flux; a rotor which includes a plurality of electrically conductive rods disposed in spaced relationship adjacent to the outer periphery thereof to cut the lines of magnetic flux produced by the stator, a conductive plate and a segmented commutating sheave, each of the rods being attached on one end to a separate segment of the commutating sheave and on the other end to the conductive plate, means for guiding successive portions of the strand material in contact with at least one segment on one side of the commutating sheave through a path of travel to form a loop of the conductive material of a predetermined length and in contact with at least one of the segments on the opposite side of the segmented commutating sheave; means for adjusting the length of the strand material in the loop; and means for rotating the rotor, whereby current, passing through the conductive rods as a result of the conductive rods cutting the lines of magnetic flux, is commutated to produce a flow of direct current in the rotor between the segment of the commutating sheave on one side contacted by the strand material, through the associated conductive rod connected to the segment of the sheave contacted by strand material, through the conductive plate, through the conductive rod associated with the segment on the opposite side of the commutating sheave which is contacted by the strand material and through the last-mentioned segment, and externally of the rotor through the loop of strand material extending between the opposite sides of the commutating sheave so that successive portions of the strand material in the loop will be heated as a result of the resistance of the strand material to the flow of current therein.

7. A brushless power supply for progressively heating a continuously advancing indefinite length of electrically conductive strand material, which comprises a stator for producing a field of magnetic flux; a rotor which includes a plurality of electrically conductive rods disposed in spaced relationship adjacent to the outer periphery thereof to cut the lines of magnetic flux produced by the stator, a conductive plate, a segmented commutating sheave, each of the rods being attached on one end to a separate segment of the commutating sheave and on the other end to the conductive plate, a solid conductive sheave positioned on the end of the rotor on which the commutator sheave is positoned and adjacent thereto, and means for connecting the conductive sheave electrically and mechanically to the conductive plate; means for guiding successive portions of the strand material in contact with one side of the segmented commutating sheave through a path of travel to form a loop of the conductive material of a predetermined length and at least partially around the conductive sheave, and means for propelling the strand material and rotating the rotor to move the conductive rods thereof transversely of the lines of magnetic flux produced by the stator; whereby current, passing through the conductive rods as a result of the conductive rods cutting the lines of magnetic flux, is commutated to produce a flow of direct current internally of the rotor between the segments of the commutating sheave contacted by strand material and the conductive sheave, and externally of the rotor through the loop of strand material extending between the conductive sheave and commutating sheave so that successive portions of the strand material in the loop will be heated as a result of the resistance of the strand material to the flow of current therein.

8. A brushless power supply for progressively heating a continuously advancing indefinite length of electrically conductive strand material, which comprises a stator for producing a field of magnetic flux; a rotor which includes a core of magnetic material, a plurality of electrically conductive rods disposed in spaced relationship adjacent to the outer periphery thereof to cut the lines of magnetic flux produced by the stator, a conductive plate, a segmented commutating sheave, each of the rods being attached on one end to a separate segment of the commutating sheave and on the other end to the conductive plate, a solid conductive sheave positioned on the end of the rotor on which the commutator sheave is positioned and adjacent thereto, and means for connecting the conductive sheave electrically and mechanically to the conducting plate; means for guiding successive portions of the strand material at least partially around the conductive sheave through a path of travel to form a loop of the conductive material of a predetermined length and in contact with one side of the segmented commutating sheave; means for adjusting the effective length of the successive portions of the strand material in the loop; and means for rotating the rotor, whereby current, passing through the conductive rods as a result of the conductive rods cutting the lines of magnetic flux, is commutated to produce a flow of direct current internally of the rotor between the segments of the commutating sheave contacted by strand material and the conductive sheave and externally of the rotor through the loop of strand material extending between the conductive sheave and commutating sheave so that successive portions of the strand material in the loop will be heated as a result of the resistance of the strand material to the flow of current therein.

9. A brushless power supply for progressively heating successive portions of a plurality of strands of electrically conductive material, which comprises a stator for producing a field of magnetic flux; a rotor which includes a driven shaft, a flat circular conductive plate secured to the driven shaft, a conductive central shaft connected mechanically and electrically to the plate, a conductive sheave connected mechanically and electrically to the conductive shaft, a core of magnetic material secured to the conductive shaft, a segmented commutative sheave, and a plurality of electrically conductive rods disposed in spaced relationship around the outer periphery of the rotor, each of the conductive rods being connected electrically and mechanically to the conductive plate on one end and to a separate segment of the commutating sheave on the other end; means for driving the driven shaft to rotate the rotor and move the conductive rods through the lines of magnetic flux produced by the stator; means for guiding successive portions of a first strand of electrically conductive material in contact with at least one segment of the commutating sheave, through a path of travel to form a loop of the conductive material and at least partially around the conductive sheave; and means for guiding successive portions of a second strand of the conductive material at least partially around the conductive sheave through a path of travel to form a loop of the conductive material of a predetermined length and in contact with at least one segment of the segmented commutating sheave diametrically opposed to that contacted by the first strand; whereby the conductive rods cutting the lines of magnetic flux produce direct current in the loops of strand material extending between the conductive sheave and segments of the commutating sheave which will heat successive portions of the strand material in the loops as a result of the resistance of the strand material to the flow of current therein.

10. A brushless power supply for heating electrically conductive strand material, which comprises a stator for producing a magnetic field; a rotor which includes a plurality of electrically conductive rods disposed in spaced relationship to each other adjacent to the outer periphery of the rotor, an electrically conductive sheave connected electrically and mechanically to adjacent ends of the conductive rods, a second electrically conductive sheave connected mechanically to and insulated electrically from the first-mentioned sheave, and rectifier means electrically connected to the opposite ends of the conductive rods to the second conductive sheave; means for guiding successive portions of the strand material at least partially around one of the conductive sheaves through a path of travel to form a loop of the conductive material of a predetermined length and at least partially around the other conductive sheave, and means for propelling the strand material and rotating the rotor to move the conductive rods thereof through the lines of magnetic flux produced by the stator; whereby current, passing through the conductive rods as a result of the conductive rods cutting the lines of magnetic flux, is rectified to produce direct current in the loop of strand material extending between the conductive sheaves so that successive portions of the strand material in the loop will be heated as a result of the resistance of the strand material to the flow of current therein.

11. A brushless power supply for heating electrically conductive strand material, which comprises a stator for producing a magnetic field; a rotor which includes an electrically conductive plate positioned adjacent to one end thereof, a plurality of electrically conductive rods disposed in spaced relationship to each other adjacent to the outer periphery of the rotor, adjacent ends of the conductive rods being secured mechanically to the conductive plate and insulated therefrom, a rectifier electrically connected to each of the conductive rods to the conductive plate, a conductive sheave connected mechanically and electrically to the conductive plate, and a second conductive sheave connected electrically and mechanically to the opposite adjacent ends of the conductive rods and connected mechanically to and insulated electrically from the first-mentioned sheave; means for guiding successive portions of the strand material at least partially around one of the conductive sheaves through a path of travel to form a loop of the conductive material of a predetermined length and at least partially around the other conductive sheave, and means for propelling the conductive strand material and rotating the rotor to move the conductive rods thereof transversely of the lines of magnetic flux produced by the stator: whereby current, passing through the conductive rods as a result of the conductive rods cutting the lines of magnetic flux, is rectified to produce direct current in the loop of strand material extending between the conductive sheaves so that successive portions of the strand material in the loop will be heated as a result of the resistance of the strand material to the flow of current therein.

12. A brushless power supply for heating electrically conductive strand material, which comprises a stator for producing a magnetic field; a rotor which includes an apertured electrically conductive plate positioned adjacent to one end thereof, a plurality of electrically conductive rods disposed in spaced relationship to each other adjacent to the outer periphery of the rotor, adjacent ends of the conductive rods being secured mechanically in associated apertures in the conductive plate and insulated therefrom, a rectifier electrically connected to each of the conductive rods to the conductive plate, a conductive sheave connected mechanically and electrically to the conductive plate, a second conductive sheave connected electrically and mechanically to the opposite adjacent ends of the conductive rods and connected mechanically to and insulated electrically from the first-mentioned sheave, and a laminated iron core insulated electrically and thermally from the remaining portions of the power supply; means for guiding successive portions of the strand material at least partially around one of the conductive sheaves, through a path of travel to form a loop of the conductive material of a predetermined length and at least partially around the other conductive sheave; means for adjusting the length of the loop; and means for rotating the rotor, whereby current, passing through the conductive rods as a result of the conductive rods cutting the lines of magnetic flux, is rectified to produce direct current in the loop of strand material extending between the conductive sheaves so that successive portions of the strand material in the loop will be heated as a result of the resistance of the strand material to the flow of current therein.

13. A brushless power supply for heating indefinite lengths of electrically conductive material, which comprises means for producing a field of magnetic flux, at least one electrically conductive member, means for moving the conductive member through the field and for moving successive portions of an indefinite length of conductive material continuously, and means for electrically and mechanically connecting the successive portions of the continuously moving indefinite length of conductive material to be heated with one end of the conductive member for at least a portion of the time during which the conductive member is passing through the field of magnetic flux and for simultaneously connecting the opposite end of the conductive member instantaneously electrically to one of successively different portions of the electrically conductive material, so as to produce heating current in the conductive material extending between the ends of the conductive member.

14. A brushless power supply for heating indefinite lengths of electrically conductive material, which comprises means for producing a field of magnetic flux, at least one electrically conductive member, means for moving the conductive member through the field and for moving successive portions of an indefinite length of conductive material continuously, means for electrically and mechanically connecting the successive portions of the continuously moving indefinite length of conductive material to be heated with one end of the conductive member for at least a portion of the time during which the conductive member is passing through the field of magnetic flux and for simultaneously connecting the opposite end of the conductive member instantaneously electrically to one of successively different portions of the electrically conductive material, and means for regulating the flow of current in the electrically conductive material so as to produce heating current in the conductive material extending between the ends of the conductive member.

15. A brushless power supply for heating indefinite lengths of electrically conductive material, which comprises means for producing a field of magnetic flux, at least one electrically conductive member designed to be moved transversely of the lines of flux of the magnetic field to produce electromotive force, a rotatable pulley over which an indefinite length of electrically conductive material to be heated is directed, at least portions of the pulley being electrically conductive, an electrically conductive portion of the pulley being connected mechanically and electrically to one end of the conductive member for movement therewith, means for moving successive portions of the indefinite length of conductive material in contact with at least one conductive portion of the pulley to rotate the pulley and move the conductive member transversely of the lines of flux of the magnetic field by forces exerted thereon by the conductive material, means for connecting the opposite end of the conductive member to one of successively different portions of the conductive material a constant predetermined distance along the conductive material from the point of contact of the sheave, and means for regulating the flow of current in the material so that heating current flow in the portion of the material extending between the pulley and the means for connecting the opposite end of the conductive member thereto as a result of the conductive member being passed transversely of the lines of flux of the magnetic fields.

References Cited in the file of this patent

UNITED STATES PATENTS

| | | |
|---|---|---|
| 284,255 | Stockwell | Sept. 4, 1883 |
| 515,613 | Roberts | Feb. 27, 1894 |

FOREIGN PATENTS

| | | |
|---|---|---|
| 330,220 | Switzerland | July 15, 1958 |
| 725,891 | Germany | Oct. 1, 1942 |